(12) United States Patent
Krueger et al.

(10) Patent No.: US 11,673,124 B2
(45) Date of Patent: Jun. 13, 2023

(54) HIGH METALS CONTENT HYDROLYSIS CATALYST FOR USE IN THE CATALYTIC REDUCTION OF SULFUR CONTAINED IN A GAS STREAM, AND A METHOD OF MAKING AND USING SUCH COMPOSITION

(71) Applicant: SHELL OIL COMPANY, Houston, TX (US)

(72) Inventors: Karl Marvin Krueger, Houston, TX (US); Fernando Gabriel Maldonado, Tomball, TX (US)

(73) Assignee: SHELL USA, INC., Houston, TX (US)

( * ) Notice: Subject to any disclaimer, the term of this patent is extended or adjusted under 35 U.S.C. 154(b) by 145 days.

(21) Appl. No.: 16/736,917

(22) Filed: Jan. 8, 2020

(65) Prior Publication Data
US 2020/0139352 A1    May 7, 2020

Related U.S. Application Data

(62) Division of application No. 15/464,499, filed on Mar. 21, 2017, now Pat. No. 10,562,014.

(60) Provisional application No. 62/312,010, filed on Mar. 23, 2016.

(51) Int. Cl.
| | | |
|---|---|---|
| *B01D 53/86* | (2006.01) | |
| *B01J 23/882* | (2006.01) | |
| *B01J 35/10* | (2006.01) | |
| *B01J 37/00* | (2006.01) | |
| *B01J 37/04* | (2006.01) | |
| *B01J 37/08* | (2006.01) | |

(52) U.S. Cl.
CPC ........ *B01J 23/882* (2013.01); *B01D 53/8603* (2013.01); *B01J 35/108* (2013.01); *B01J 35/109* (2013.01); *B01J 35/1061* (2013.01); *B01J 35/1066* (2013.01); *B01J 35/1071* (2013.01); *B01J 35/1076* (2013.01); *B01J 37/0009* (2013.01); *B01J 37/04* (2013.01); *B01J 37/08* (2013.01); *B01D 2255/2092* (2013.01); *B01D 2255/20746* (2013.01); *B01D 2255/20769* (2013.01); *B01D 2255/92* (2013.01)

(58) Field of Classification Search
None
See application file for complete search history.

(56) References Cited

U.S. PATENT DOCUMENTS

| | | | |
|---|---|---|---|
| 3,554,689 A | 1/1971 | Bloembergen et al. | |
| 3,692,698 A | 9/1972 | Riley et al. | |
| 4,097,413 A * | 6/1978 | Simpson | B01J 23/882 |
| | | | 208/216 R |
| 4,456,701 A | 6/1984 | Chen | |
| 4,618,999 A | 10/1986 | Watkinson | |
| 4,668,491 A | 5/1987 | Wimmer et al. | |
| 4,945,079 A | 7/1990 | Pedersen et al. | |
| 5,132,098 A | 7/1992 | Kvasnikoff et al. | |
| 5,609,845 A * | 3/1997 | Cimini | B01J 23/881 |
| | | | 423/416 |
| 6,080,379 A | 6/2000 | Nedez et al. | |
| 8,969,242 B2 * | 3/2015 | Klein | C10G 47/12 |
| | | | 502/439 |
| 2003/0194366 A1* | 10/2003 | Srinivas | B01D 53/8612 |
| | | | 423/230 |
| 2008/0060977 A1 | 3/2008 | Bhan | |
| 2009/0098032 A1* | 4/2009 | Yang | B01J 21/12 |
| | | | 423/213.2 |
| 2009/0298677 A1* | 12/2009 | Radlowski | B01J 27/19 |
| | | | 502/167 |
| 2011/0274604 A1* | 11/2011 | Chatterjee | B01D 53/8612 |
| | | | 423/222 |
| 2012/0148468 A1 | 6/2012 | Massie | |
| 2014/0134096 A1* | 5/2014 | Angelini | C01B 17/0404 |
| | | | 423/576.8 |
| 2015/0273447 A1 | 10/2015 | Jongkind et al. | |
| 2015/0291420 A1* | 10/2015 | Colozzi | C01B 3/04 |
| | | | 423/658.2 |
| 2015/0314282 A1 | 11/2015 | Bhan et al. | |

FOREIGN PATENT DOCUMENTS

| | | |
|---|---|---|
| CN | 101426579 A | 5/2009 |
| JP | 2012066237 A | 4/2012 |
| RU | 2074025 C1 | 2/1997 |
| SU | 1373429 A1 | 2/1988 |

OTHER PUBLICATIONS

International Search Report and Written Opinion received for PCT Patent Application No. PCT/US2017/023318, dated Jun. 9, 2017, 9 pages.

Xiang et al., Biomodal Mesoporous—AlO: A Promising Support for CoMo-based Catalyst in Hydrodesulfurization of 4,6—DMDBT, Elsevier, vol. 65, Issue No. 12, Mar. 11, 2011, pp. 1765-1767, XP028349735.

* cited by examiner

*Primary Examiner* — Sheng H Davis
(74) *Attorney, Agent, or Firm* — Shell USA, Inc.

(57) ABSTRACT

Disclosed is a composition useful in the hydrolysis of sulfur compounds that are contained in a gas stream. The composition comprises a calcined co-mulled mixture of psuedoboehmite, a cobalt compound, and a molybdenum compound such that the composition comprises gamma-alumina, at least 7.5 wt. % molybdenum, and at least 2.75 wt. % cobalt. The composition is made by forming into an agglomerate a co-mulled mixture pseudoboehmite, a cobalt component, and a molybdenum component followed by drying and calcining the agglomerate to provide a catalyst composition comprising gamma-alumina, at least 7.5 wt. % molybdenum, and at least 2.75 wt. % cobalt.

4 Claims, 1 Drawing Sheet

HIGH METALS CONTENT HYDROLYSIS CATALYST FOR USE IN THE CATALYTIC REDUCTION OF SULFUR CONTAINED IN A GAS STREAM, AND A METHOD OF MAKING AND USING SUCH COMPOSITION

This application is a divisional of U.S. Non-Provisional application Ser. No. 15/464,499 filed Mar. 21, 2017, which claims priority from the U.S. Provisional Application No. 62/312,010, filed Mar. 23, 2016, which is incorporated herein by reference.

The present invention relates to a catalyst composition useful in the catalytic reduction of sulfur compounds that are contained in a gas stream, a method of making such catalyst composition, and a hydrolysis process for the reductive conversion of sulfur compounds contained in a gas stream.

In the well-known Claus process, an acid gas that contains a significant percentage of hydrogen sulfide ($H_2S$) is combusted in a thermal stage in order to oxidize a portion of the $H_2S$ to sulfur dioxide ($SO_2$). This combustion is controlled so as to thereby provide a process gas stream containing $H_2S$ and $SO_2$ that are present therein in an approximate molar ratio of 2 moles of $H_2S$ per mole of $SO_2$ (2:1). This process gas stream is passed to a catalytic stage whereby the $H_2S$ and $SO_2$ are reacted in the presence of an alumina catalyst in accordance with the Claus reaction to yield elemental sulfur and water. The sulfur is then condensed from the Claus reaction gas, and a Claus tail gas stream is yielded. The Claus tail gas stream typically contains small concentrations of $H_2S$ and other sulfur compounds, such as, $SO_2$, carbon disulfide ($CS_2$), carbonyl sulfide (COS), and elemental sulfur (S). In order for this tail gas stream to be combusted, or otherwise disposed of, it must be further processed in order to remove much of the sulfur therefrom to thereby provide a treated gas having a sufficiently low sulfur content that allows its combustion or release into the atmosphere.

One method by which the tail gas is treated is to pass it to a reduction reactor whereby the sulfur compounds (i.e., $SO_2$, $CS_2$, COS, and S) in the tail gas stream are catalytically reduced to $H_2S$ so that provided is a treated gas stream having a reduced concentration of the sulfur compounds due to their conversion to $H_2S$. This treated gas stream may then be further processed to remove the $H_2S$ therefrom, for example, by passing the treated gas stream to an absorption unit whereby it is contacted with an absorbent for removing the $H_2S$ from the treated gas stream.

One early process taught by U.S. Pat. No. 3,554,689 provides for the removal of carbon oxysulfide, i.e., COS, from a gas stream by catalytic hydrolysis into $H_2S$. Disclosed in this patent is a process by which COS is removed from combustion gases that also contain oxygen by first contacting the gases with an active hydrogenation catalyst for converting the oxygen and, thereafter, contacting the resulting substantially oxygen-free gases with a COS conversion catalyst for converting the COS to $H_2S$. The $H_2S$ can then be removed by absorption. The conversion of COS may be effected at temperatures below 150° C. The COS conversion catalyst includes alumina, having a specific surface area of more than 50 $m^2$/g and can contain one or more Group VI and/or Group VIII metal oxides. Further embodiments of the COS conversion catalyst include the presence therein of an amount of alkali metal phosphate. One requirement of the process of the '689 patent is for the combustion gases to first undergo a catalytic oxygen removal step so that the gas that is treated to remove the COS by catalytic hydrolysis is substantially oxygen free.

U.S. Pat. No. 4,668,491 discloses a process and catalyst for the selective catalytic hydrolysis of the sulfur compounds COS and/or $CS_2$ that are present in a carbon monoxide containing process gas. The hydrolysis catalyst disclosed by the '491 patent is an alkalized chromium oxide-aluminum oxide catalyst that includes chromium oxide and an alkali metal compound supported on an aluminum oxide carrier with gamma alumina being the preferred form of aluminum oxide. The carbon monoxide content of the process gas is significant and is passed over the hydrolysis catalyst at temperatures in the range of from 100° C. to 350° C. The alkalized chromium oxide-aluminum oxide catalyst is produced by immersing an aluminum oxide carrier in a chromium salt solution followed by drying and calcining the impregnated carrier. The resulting chromium-impregnated and calcined support is then immersed in a potassium salt and dried.

U.S. Pat. No. 5,132,098 discloses a process in which the sulfur compounds of $SO_2$, $CS_2$, COS and elemental sulfur contained in a Claus unit tail gas (residual gas) are catalytically converted by either hydrogenation or hydrolysis to $H_2S$. This hydrogenation or hydrolysis treatment is carried out at a temperature in the range of from 140° C. to 550° C. using a catalyst that contains a compound of a metal selected from the metals of groups Va, VIa and VIII of the periodic table which is deposited on a silica or silica/alumina support. A more specific catalyst disclosed in the '098 patent is an impregnated bead that includes cobalt oxide and molybdenum oxide deposited on alumina. While the '098 patent discloses a catalyst including alumina impregnated with 1.75 wt % cobalt and 8 wt % molybdenum, there are no teachings concerning the ranges of these components or concerning the form of the alumina of the catalyst. There further is no recognition of the importance of the pore structure characteristics of the catalyst in providing for low-temperature hydrogenation and hydrolysis reactions or in providing for high conversion of sulfur compounds to hydrogen sulfide.

U.S. Pat. No. 6,080,379 discloses an alumina catalyst used for the treatment of sulfur-containing gases either by carrying out the Claus reaction or by hydrolysis. The catalyst has an optimized macroporosity wherein its porosity is such that the volume in the pores of diameter greater than 0.1 μm (1,000 Å) is greater than 12 ml/100 g of catalyst and that the ratio of the volume in the pores of diameter greater than 1 μm (10,000 Å) to the volume in the pores of diameter greater than 0.1 μm (1,000 Å) is greater than or equal to 0.65. The alumina may possibly be a transition alumina selected from the group consisting of rho (ρ), chi (χ), eta (η), gamma (γ), kappa (κ), theta (θ), delta (δ), and alpha (α). The catalyst may additionally contain a metal oxide. The use of the catalyst in the hydrolysis of $CS_2$ appears to require a significantly high reactor temperature but still without providing for a high $CS_2$ conversion.

U.S. Pat. No. 8,142,748 discloses a hydrolysis catalyst that provides for the low-temperature reduction of sulfur compounds contained in a gas stream. The catalyst is an impregnated catalyst. One significant characteristic of the catalyst is its macroporosity, which provides a pore structure such that a large percentage, in particular, greater than 30%, of its total pore volume is contained within the pores of a pore diameter greater than 10,000 Å. The catalyst comprises alumina and relatively high loadings of Group VI and Group VIII metals. A preferred embodiment of the catalyst has at least 50 percent alumina in the form of eta-alumina.

There are ongoing efforts to develop improved catalyst compositions that provide for high percentage conversion under low-temperature reaction conditions of sulfur compounds that are contained in gas streams such as tail gas yielded from Claus units.

Thus, accordingly, provided is a catalyst composition useful in the catalytic reduction of sulfur compounds contained in a gas stream. The catalyst composition comprises: a formed agglomerate of a calcined, comulled mixture of pseudoboehmite, a cobalt compound and a molybdenum compound. The formed agglomerate has been calcined to provide the catalyst composition that comprises gamma-alumina, at least 7.5 wt. % molybdenum; and at least 2.75 wt. % cobalt.

The catalyst composition is made by a method that comprises mixing pseudoboehmite, a cobalt component and a molybdenum component to form a comulled mixture; forming the comulled mixture into a formed agglomerate; and drying and calcining the formed agglomerate to provide the catalyst composition, comprising gamma-alumina, at least 7.5 wt. % molybdenum; and at least 2.75 wt. % cobalt, wherein each wt. % is based on the total weight of the catalyst composition and the metal as an oxide regardless of its actual form.

The catalyst composition has application in the hydrolysis of sulfur compounds and carbon monoxide contained in gas streams. This process comprises introducing a gas stream, comprising a sulfur compound or carbon monoxide, or both, into a reactor that defines a reaction zone containing the catalyst composition and which is operated at suitable reaction conditions; and contacting the gas stream with the catalyst composition under suitable hydrolysis reaction conditions.

Figure 1:
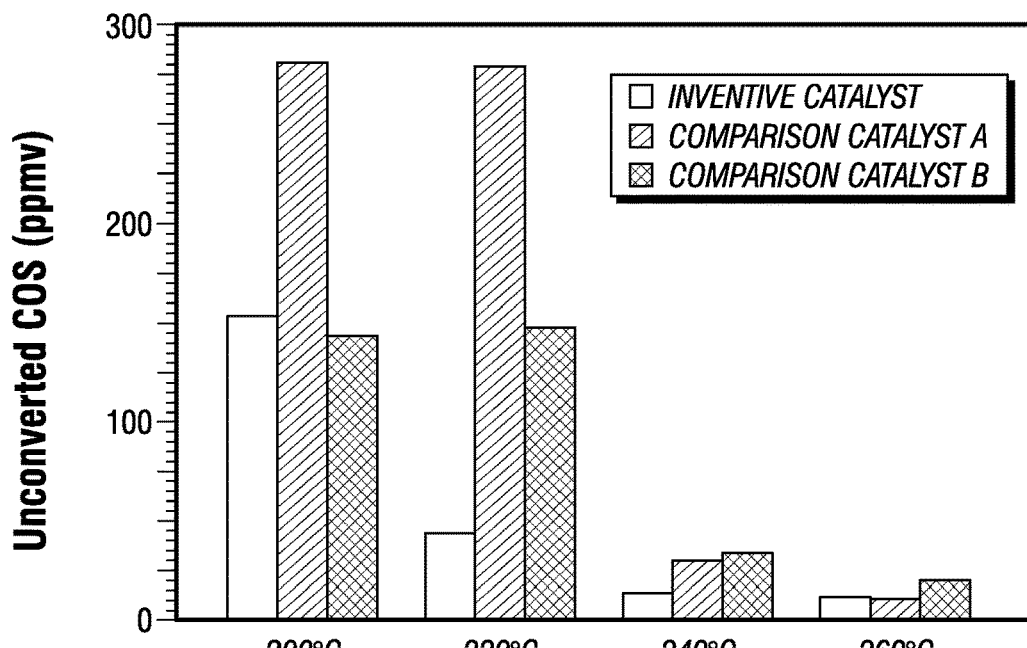
FIG. 1 is a bar chart comparing the performance of the inventive catalyst to that of comparison catalysts when used in the hydrolysis conversion of carbonyl sulfide (COS) contained in a synthetic tail gas feed by showing the unconverted COS of the effluent of the reactor operated at various reactor temperatures.

The catalyst of the invention has properties that make it particularly useful in the low-temperature hydrolysis of carbonyl sulfide that may be contained in gas streams such as Claus tail gases or other gas streams having concentrations of carbonyl sulfide that need to be removed or reduced to acceptable levels. This catalyst also has application in low-temperature conversion of carbon monoxide of the water-gas shift reaction.

The term hydrolysis reaction is used in this specification to mean the reaction of carbonyl sulfide with water to yield hydrogen sulfide and carbon dioxide.

The references herein to the water-gas shift reaction are to the equilibrium reaction of carbon monoxide and water to carbon dioxide and hydrogen.

The inventive catalyst composition has a unique combination of features that provide for its enhanced catalytic properties. It is believed that the combination of co-mulling of the catalyst components along with the high metals content of the finished catalyst contributes to its enhanced properties. It also is thought that the use of the pseudoboehmite form of alumina in the preparation of the formed agglomerate of the co-mulled mixture and the subsequent conversion of the pseudoboehmite alumina form to the gamma alumina form to yield the finished catalyst contributes to the enhanced properties of the inventive catalyst. The manner by which the catalyst is prepared and its components provide the inventive composition having a specific pore structure that in combination with other features of the catalyst further contributes to its enhanced properties.

Thus, the catalyst necessarily is a co-mulled catalyst. What is meant by the use of the term "co-mulled" is that the starting materials of the catalyst are combined and mixed together to form a mixture of the individual components that is preferably or substantially uniform or homogeneous. This term is intended to be broad enough in scope to include mixing of the starting materials that include pseudoboehmite, a cobalt compound, and a molybdenum compound so as to yield a co-mulled mixture that can be formed into agglomerate particles. The co-mulled mixture can be a paste or a plastic mixture that is capable of being formed into agglomerate particles by any of the known agglomeration methods or extruded into extrudate particles by any of the known extrusion methods.

The preferred method of agglomerating the co-mulled mixture is by extrusion to form extrudate particles having overall diameters in the range of from 0.5 mm to 10 mm or from 0.75 mm to 8 mm and length to diameter ratios of from 1:1 to 10:1 or even higher. The extrudates can be any of the typical shapes such as cylinders and multilobal shapes.

Thus, the formation of the co-mulled mixture is done by any method or means known to those skilled in the art, including, but not limited to, the use of such suitable types of solids-mixing machines as tumblers, stationary shells or troughs, muller mixers, which are either batch type or continuous type, and impact mixers, and the use of such suitable types of either batch-wise or continuous mixers for mixing solids and liquids or for the formation of paste-like mixtures that are extrudable.

Suitable types of batch mixers include, but are not limited to, change-can mixers, stationary-tank mixers, double-arm kneading mixers that are equipped with any suitable type of mixing blade.

Suitable types of continuous mixers include, but are not limited to, single or double screw extruders, trough-and-screw mixers and pug mills.

The mixing of the starting materials used in the preparation of the co-mulled mixture can include water and appropriate amounts of a mineral acid, such as nitric acid, as is necessary to provide the aforementioned paste-like mixtures having a loss on ignition (LOI) in the range of from 40% to 80% as determined by the standard test method ASTM D7348. It has been found that the co-mulled mixture with an LOI in this range provides for a paste having desirable extrusion properties, and it contributes to a finished catalyst product having the required pore structure characteristics of the inventive catalyst as described in detail throughout this specification.

The mixing of the starting materials used in the preparation of the co-mulled mixture is conducted for time period necessary to properly homogenize the co-mulled mixture. Generally, the blending time is in the range of upwardly to 12 or more hours. Typically, the blending time is in the range of from 0.1 hours to 1 hour.

The alumina powder component used in the formation of the co-mulled mixture comprises particles of alumina that is predominantly in the pseudo-boehmite crystalline form ($Al_2O_3 \cdot xH_2O$ where x is an intermediate value between x=1 boehmite and x=3 gibbsite), with about 20 wt. % to 30 wt. % water content, and is characterized as having a median pore diameter by surface area from mercury porosimetry (with a contact angle of 140 degrees) in the range of from about 60 Å to about 120 Å. The alumina is in a reasonably divided state so as to be in the form of a powder (when dry) that allows for its co-mulling or mixing with the metal compounds, water and other constituents that make up the co-mulled mixture of the invention.

The alumina powder component may contain silica and, if silica is present, it is preferred for the alumina to contain less than 2 wt. % silica, and, most preferred, less than 1 wt. % silica. The alumina powder may have an absence of a material amount of silica. The alumina component used in the preparation of the co-mulled mixture comprises, consists essentially of, or consists of pseudoboehmite that is in a reasonably divided state so as to be in the form of a powder (when dry) that allows for its co-mulling or mixing with the metal compounds, water and other constituents that make up the co-mulled mixture of the invention.

The alumina particles of the alumina powder may be described in terms of mesh size with most of the particles, i.e. at least 90 wt. % of the particles, being able to pass through the mesh of a sieve No. 35 (nominal sieve opening of 0.500 mm) and most of the particles, i.e., at least 90 wt. % of the particles, not being able to pass through or being retained by the mesh of a sieve No. 400 (nominal sieve opening of 0.037 mm).

The inventive catalyst further has a particular pore structure that as noted above contributes to its enhanced properties. It is important for the catalyst to have a bimodal pore structure but with most of its total pore volume being contained in pores having pore diameters of less than 10,000 angstroms (Å). In particular, less than 6 percent (%) of the total pore volume of the catalyst is contained within its pores having a pore diameter greater than 10,000 Å. The preferred catalyst composition has less than 5%, and, more preferred, less than 4% of its total pore volume contained in pores of a pore diameter greater than 10,000 Å.

The pore structure of the catalyst is such that the ratio of the total volume of pores having a diameter greater than 10,000 Å to the total volume of pores having a diameter greater than 1,000 Å is less than 0.6. It is preferred for this ratio to be less than 0.5, and, most preferred, the ratio is less than 0.4.

In addition to the pore structure characteristics of the inventive catalyst having a small portion of its total pore volume in pores having a diameter greater 10,000 Å, the pore structure is bimodal in that a first major portion of the total pore volume of the inventive catalyst is contained within its pores having a diameter in the range of from 50 Å to 150 Å, and a second major portion of the total pore volume is contained within its pores having a diameter in the range of from 1,000 to 10,000 Å. Only a minor portion of the total pore volume of the catalyst is contained within the pores having a diameter in the range of from 150 Å to 1,000 Å.

The first major portion of the total pore volume is in the range of from 15% to 60% of the total pore volume of the catalyst, and the second major portion of the total pore volume is in the range of from 10% to 50% of the total pore volume of the catalyst.

The minor portion of the total pore volume is less than 15% of the total pore volume of the catalyst. Preferably, the minor portion is less than 13% and, it is even less than 10% of the total pore volume of the catalyst.

Thus, the bimodal pore structure of the catalyst is such that greater than 15%, preferably, greater than 20%, and, more preferably, greater than 25% of the total pore volume of the catalyst is contained in its pores having a pore diameter in the range of from 50 Å to 150 Å. The upper end of the range of pore volume contained in the pores having a pore diameter in the range of from 50 Å to 150 Å is less than 60% of the total pore volume of the catalyst, preferably, less than 50%, and, most preferably, less than 40%.

Regarding the second major portion of the bimodal pore structure of the catalyst, it includes greater than 10%, preferably, greater than 12%, and, more preferably, greater than 15% of the total pore volume of the catalyst is contained in its pores having a pore diameter in the range of from 1,000 Å to 10,000 Å. The upper end of the range of pore volume contained in the pores having a pore diameter in the range of from 1,000 Å to 10,000 Å is less than 50% of the total pore volume of the catalyst, preferably, less than 45%, and, most preferably, less than 40%.

An essential feature of the inventive catalyst is for it to have a high level or concentration of cobalt and molybdenum metals.

The cobalt compound of the co-mulled mixture is a cobalt compound that is convertible to an oxide upon calcination within the presence of oxygen. The cobalt compound can be selected from suitable cobalt salt compounds. Such compounds may include a cobalt compound selected from ammonium cobalt compounds, and phosphates, nitrates, oxalates, sulfates, and halides of cobalt. A particularly favorable cobalt salt that is found to be a useful cobalt compound for the co-mulled mixture is cobalt nitrate. It is preferable to combine the cobalt compound with the other components of the co-mulled mixture in the form of a first aqueous solution that comprises cobalt. The first aqueous solution may be formed by dissolving the cobalt salt in water. The most preferred cobalt salt is cobalt nitrate.

The molybdenum compound of the co-mulled mixture is a molybdenum compound that is convertible to an oxide upon calcination within the presence of oxygen. The molybdenum compound can be selected from suitable molybdenum salt compounds. Such compounds may include a molybdenum compound selected from such compounds as ammonium molybdate, potassium molybdate, sodium molybdate, phosphomolybdic acid, molybdenum disulphide, molybdenum trioxide, and molybdic acid. It is preferable to combine the molybdenum compound with the other components of the co-mulled mixture in the form of a second aqueous solution that comprises molybdenum. The second aqueous solution may be formed by dissolving the molybdenum salt in water. The most preferred molybdenum salt is an ammonium molybdate such as ammonium heptamolybdate and ammonium dimolybdate.

To provide the finished catalyst composition of the invention, the formed agglomerate of the co-mulled mixture is dried and then calcined. The drying of the co-mulled mixture is not a critical step and is generally performed in air and at a drying temperature in the range of from 20° C. to 125° C. The time period for drying is any suitable time period that can provide the desired amount of drying.

Calcination of the co-mulled mixture is an essential and important feature of the inventive catalyst composition in that it provides for the conversion of the metal compounds to their oxide forms and the pseudoboehmite alumina to the gamma alumina form. It is thought that the co-mulling of the pseudoboehmite with the metal components and subsequent conversion by calcination of these components contributes to providing a catalyst product having especially good catalytic properties.

The calcination of the formed aggregates or agglomerates of the co-mulled mixture is conducted in the presence of an oxygen-containing fluid, such as air, at a temperature and for a time period that are suitable for achieving the desired degree of calcination to provide the final catalyst composition of the invention. Generally, the calcination temperature is in the range of from 300° C. to 800° C., preferably, from 350° C. to 700° C., and more preferably, from 400° C. to 600° C. The calcination time period can be in the range of from 0.1 hour to 96 hours.

The concentration levels of the metal components of the calcined co-mulled mixture are a critical feature of the inventive catalyst. The metals loading is considered to be relatively high and it is the combination of the high concentrations of the metals with the other important features of the catalyst that provide for a catalyst having the aforementioned enhanced catalytic properties.

The cobalt component of the calcined co-mulled mixture is at least 2.75 weight percent (wt. %). It is more desirable for the cobalt to be present in the calcined co-mulled mixture in an amount in the range of from 2.85 wt. % to 6 wt. %. Preferably, the cobalt component is present in the calcined co-mulled mixture in an amount in the range of from 3.0 to 5 wt. %, and, more preferably, the cobalt component is present in an amount in the range of from 3.1 to 4 wt. %.

The molybdenum component of the calcined co-mulled mixture is at least 7.5 weight percent (wt. %). It is more desirable for the molybdenum to be present in the calcined co-mulled mixture in an amount in the range of from 7.75 wt. % to 15 wt. %. Preferably, the molybdenum component is present in the calcined co-mulled mixture in an amount in the range of from 8.0 to 12 wt. %, and, more preferably, the molybdenum component is present in an amount in the range of from 8.5 to 10.5 wt. %.

The references herein to the weight percent of a metal component of the calcined co-mulled mixture are based on the total weight of the catalyst composition with the metal component as an oxide regardless of the actual form of the metal component.

The inventive catalyst, thus, is a calcined, formed agglomerate of the co-mulled mixture that comprises, consists essentially of, or consists of gamma alumina, a cobalt component, and a molybdenum component. The amount of the gamma alumina component contained in the catalyst may fill up to the balance of the composition after taking into account the metals. Thus, the gamma alumina component of the catalyst is present in an amount in the range up to about 89.75 wt. % of the composition. Typically, the catalyst includes gamma alumina in an amount in the range of from about 80 wt. % to about 89 wt. %, preferably, from 85 wt. % to 89 wt. %.

The inventive catalyst composition is useful in the hydrolysis of sulfur compounds that are contained in a gas stream, and, more particularly, the catalyst composition is especially useful in the treatment of tail gas streams generated by Claus process units in order to convert the sulfur compounds contained in the tail gas stream to $H_2S$, which subsequently may be removed by any of the many suitable means or methods known to those skilled in the art for removing $H_2S$ from a gas stream.

The catalyst composition has certain unique catalytic properties when used in the treatment of Claus unit tail gas streams that allows for the operation of a hydrolysis reactor at lower temperature conditions than required for hydrolysis reactors that utilize conventional catalysts, and the catalyst composition provides for a high conversion of the sulfur compounds even at the lower reactor temperature conditions.

The catalyst composition further allows for the passing of the gas stream through the hydrolysis reactor at a much higher flow rate, and, thus, a much higher space velocity, than is allowed for hydrolysis reactors that are loaded with conventional catalysts, but, still provide for a high conversion of sulfur compounds at the reduced reactor temperature conditions.

In the operation of a typical conventional hydrolysis reactor system, which includes a reactor loaded with a conventional hydrolysis catalyst, the tail gas is required to be heated up significantly prior to its introduction into the hydrolysis reactor. This is due to the tail gas that is discharged from a Claus unit passing from the sulfur condenser that operates close to the condensation temperature of elemental sulfur. The temperature of a typical Claus unit tail gas stream is in the range of from 110° C. to 125° C. For conventional hydrolysis units, the tail gas typically must be heated up so that the introduction temperature, or reactor inlet temperature, of the tail gas feed to the hydrolysis reactor is in the range of from 250° C. to 350° C. Any reduction of this required tail gas feed inlet temperature to the hydrolysis reactor will provide significant energy savings in its operation.

The use of the inventive catalyst composition in the treatment of a Claus tail gas stream can, thus, provide significant energy savings by reducing the temperature required to treat a Claus tail gas stream.

The gas stream that can be treated using the inventive catalyst composition includes one or more gaseous compounds, and, further, it comprises at least one sulfur compound. As the term is used herein, a sulfur compound is a molecular or elemental compound selected from the group of compounds consisting of carbonyl sulfide (COS), carbon disulfide ($CS_2$), sulfur dioxide ($SO_2$), and elemental sulfur ($S_x$). Hydrogen sulfide is omitted from this definition of a sulfur compound; because, the inventive catalyst composition is not intended to provide for the conversion of $H_2S$, but, rather, the sulfur compounds are intended to be reduced by a reduction reaction to hydrogen sulfide.

The hydrogen sulfide may afterward be removed from the treated gas stream. The gas stream, thus, includes a compound that is normally gaseous or is in the gas phase at the temperature and pressure conditions of the hydrolysis reactor operation. Examples of gaseous compounds, other than the aforementioned sulfur compounds, include nitrogen, oxygen, carbon dioxide, carbon monoxide, hydrogen, water, and lower hydrocarbons such as methane, ethane and ethylene.

The total concentration of sulfur compounds contained in the gas stream that is charged to or introduced into the hydrolysis reactor containing the inventive catalyst composition can be in the range of from 0.01 volume % (100 ppmv) to 5 volume % of the total gas stream. More typically, the sulfur compound concentration is in the range of from 0.02 vol. % (200 ppmv) to 3 vol. %.

As earlier noted, the catalyst composition is particularly suited for the treatment of a Claus tail gas stream in order to convert the sulfur compounds contained therein to hydrogen sulfide so as to provide a treated gas stream having a reduced concentration of sulfur compounds below the concentration of sulfur compounds in the tail gas stream to be treated. The following Table 1 presents typical ranges for the more common components that make up a Claus tail gas stream.

TABLE 1

Claus Tail Gas Composition

| Component | Broad Range (vol. %) | Intermediate Range (vol. %) | Narrow Range (vol. %) |
|---|---|---|---|
| $H_2S$ | 0.2-2 | 0.4-1.5 | 0.6-1.2 |
| $SO_2$ | 0.1-1 | 0.2-0.75 | 0.3-0.6 |
| $S_x$ | 0-0.2 | 0.005-0.15 | 0.01-0.1 |
| $CO_2$ | 1-25 | 2-22 | 3-20 |
| $H_2O$ | 20-50 | 25-40 | 30-35 |
| $N_2$ | 40-80 | 45-70 | 50-60 |
| $H_2$ | 0.5-4 | 1-3 | 1.5-2.5 |
| CO | 0.01-2 | 0.1-1 | 0.2-0.8 |
| COS | 0.005-1 | 0.015-0.5 | 0.01-0.1 |
| $CS_2$ | 0.005-1 | 0.015-0.5 | 0.01-0.1 |
| Total Sulfur Comp. | 0.11-3.2 | 0.23-1.9 | 0.33-0.9 |

In the hydrolysis process of the invention, a gas stream, having a concentration of a sulfur compound, is introduced into a hydrolysis reactor that contains the catalyst composition and that is operated at suitable hydrolysis or reduction reaction conditions. Within the hydrolysis reactor, the gas stream is contacted with the catalyst composition that is contained therein. A treated gas stream, having a reduced concentration of the sulfur compound, is yielded from the hydrolysis reactor. While the treated gas stream will have an increase in the concentration of $H_2S$ over that of the gas stream, the treated gas stream will have a reduced concentration of sulfur compounds over that of the gas stream. The reduced concentration of sulfur compounds should, generally, be less than 100 ppmv, preferably, less than 50 ppmv, and, most preferably, less than 30 ppmv.

As previously noted, one advantage from the use of the inventive catalyst composition in the hydrolysis of a Claus tail gas stream is that it allows for the operation of the hydrolysis reactor at a relatively low inlet temperature, for example, of less than 250° C. There is a minimum temperature at which the gas stream should be introduced into the hydrolysis reactor, and, thus, the inlet temperature at which the gas stream is charged to or introduced into the hydrolysis reactor is generally in the range of from 140° C. to 250° C. It is preferred for the introduction temperature to be in the range of from 150° C. to 240° C., and, more preferred, the introduction temperature is in the range of from 160° C. to 230° C. It is most preferred for the introduction temperature of the gas stream into the hydrolysis reactor to be in the range of from 170° C. to 220° C.

The operating pressure of the hydrolysis reactor is generally in the range of from 1 bar (14.5 psi) to 100 bar (1450.3 psi), preferably, from 2 bar (29.0 psi) to 70 bar (1015.3 psi), and, more preferably, from 3 bar (43.5 psi) to 50 bar (725.2 psi).

The flow rate at which the gas stream and, if any, the added reducing gas, are introduced into the hydrolysis reactor is generally such as to provide a gaseous hourly space velocity (GHSV) that is in the range of from 10 $hr^{-1}$ to 10,000 $hr^{-1}$. The term "gaseous hourly space velocity" refers to the numerical ratio of the rate at which the hydrocarbon feedstock is charged to the hydrolysis reactor in volume per hour divided by the volume of catalyst contained in the hydrolysis reactor to which the gas stream is charged. The preferred GHSV is in the range of from 10 $hr^{-1}$ to 8,000 $hr^{-1}$, more preferably, from 500 $hr^{-1}$ to 5,000 $hr^{-1}$, and, most preferably, from 1000 $hr^{-1}$ to 4,000 $hr^{-1}$.

In the processing of a Claus tail gas stream, in most instances, it will contain concentrations of water and hydrogen, which can be the source of the reducing gas required for the hydrolysis reaction of the hydrolysis process. But, in the event that the gas stream does not contain a sufficient concentration of reducing gas components, reducing gas may be added as needed to the gas stream. It is generally desirable to have amounts of the reducing gases in the gas stream that are stoichiometrically required to allow for the hydrolysis reactions to proceed to close to completion.

The following examples are presented to further illustrate certain aspects of the invention, but they are not to be construed as unduly limiting the scope of the invention.

EXAMPLE I

This Example I illustrates the preparation of the inventive catalyst composition and of the comparison catalyst.

Inventive Catalyst Composition

An embodiment of the inventive catalyst composition was prepared by mulling a wide pore alumina powder, which comprised primarily psuedoboehmite, with nitric acid, and water in such proportions as to provide a plastic mixture, e.g., an extrudable mixture, having a water content such that its loss on ignition is around 61%. An aqueous cobalt solution, including cobalt, was prepared by dissolving cobalt nitrate in water and an aqueous molybdenum solution, including molybdenum, was prepared by dissolving ammonium dimolybdate in water with 30% hydrogen peroxide. The two metal solutions were added to the mulling mixture and, after mixing for a period of time, a small percentage of ammonium hydroxide was mixed with the mulling mixture. The resulting mixture was then extruded through 3.2 mm trilobe extrusion dies, and the extrudates were dried and calcined. The finished catalyst composition included alumina that was predominately in the gamma form, 9.4 wt. % molybdenum, and 3.6 wt. % cobalt. The wt. % of the metals is based on the total weight of the finished catalyst with the metals in the oxide form.

Comparison Catalyst Composition A

Comparison Catalyst Composition A was prepared in a similar manner as was the inventive catalyst with the exception that the concentrations of the metals were substantially lower than those of the inventive catalyst composition. The finished comparison catalyst composition A contained 7.2 wt. % molybdenum and 2.5 wt. % cobalt.

Comparison Catalyst Composition B

An impregnation solution was prepared by mixing aqueous ammonia, ammonium dimolybdate and cobalt hydroxide in amounts such as to target in the finished catalyst 8.5 wt. % molybdenum (on an elemental basis) and 3.3 wt. % cobalt (on an elemental basis). This mixture was heated to 45° C. and an amount of monoethanolamine (MEA) of from 1.2 to 1.5 moles MEA per mole cobalt was added to the mixture. The mixture was stirred while maintaining the temperature until the metal salts were digested. The solution was then cooled to approximately 30° C. and topped-off with water so as to provide a total volume of solution that approximated the pore volume of the alumina spheres which were to be impregnated with the solution. Alumina spheres or beads having a nominal diameter of 4 mm were impregnated with the solution and aged for two hours with occasional mixing to prevent agglomeration. The impregnated alumina spheres were dried in a convection oven at a temperature of 125° C. for one hour. The dried spheres were calcined in a muffle furnace at a temperature of 538° C. for one hour.

EXAMPLE II

This Example II illustrates the use of the catalysts described in Example I in the hydrolysis of a gas stream containing a concentration of at least one sulfur compound and presents performance data for the catalysts.

The catalysts of Example I were performance tested using a tail gas pilot unit reactor equipped with a tube furnace used to control the reactor temperature. In preparation for the activity testing, each respective catalyst was sulfided by introducing into the reactor 3 hours at 300° C. and a 467 GHSV a feed comprising $H_2S$ and $H_2$. A synthetic tail gas that included $H_2S$, $SO_2$, COS, $CS_2$, S, $H_2$, CO, $N_2$, and steam, and having the typical composition as shown in Table 2, was then charged to the tail gas reactor, operated at various reactor temperatures, at a rate so as to provide a 2052 nGHSV (normal gas hourly space velocity, 3 psi unit pressure).

TABLE 2

Typical Feed Composition

| Component | Mole % |
|---|---|
| $H_2$ | 2 |
| $CO_2$ | 7 |
| $H_2S$ | 0.8 |
| CO | 1 |
| COS | 0.025 |
| $SO_2$ | 0.4 |
| $CH_3SH$ | 0 |
| $CS_2$ | 0.025 |
| $CH_4$ | 0 |
| $H_2O$ | 26 |
| S | 0 |
| $N_2$ | 62.75 |

The composition of the reactor effluent for each of the reactor temperature conditions was analyzed using gas chromatography. The results from the testing are presented in the following Tables 3-6, which are further illustrated by the bar charts of FIG. 1 and FIG. 2.

TABLE 3

Unconverted COS in the Reactor Effluent

| Reactor Isothermal Temp (° C.) | Uncoverted COS - Inventive Catalyst (ppmv) | Uncoverted COS - Comparison Catalyst A (ppmv) | Unconverted COS - Comparison Catalyst B (ppmv) | Improvement vs. Catalyst B (%) |
|---|---|---|---|---|
| 260 | 12 | 11 | 20 | 40 |
| 240 | 14 | 30 | 34 | 59 |
| 220 | 44 | 284 | 147 | 70 |
| 200 | 154 | 281 | 144 | −7 |

TABLE 4

Unconverted CO in the Reactor Effluent

| Reactor Isothermal Temp (° C.) | Uncoverted CO - Inventive Catalyst (wt %) | Uncoverted COS - Comparison Catalyst A (wt %) | Unconverted CO - Comparison Catalyst B (wt %) | Improvement vs. Catalyst B (%) |
|---|---|---|---|---|
| 260 | 0.018 | 0.041 | 0.030 | 38 |
| 240 | 0.023 | 0.072 | 0.045 | 50 |
| 220 | 0.037 | 0.405 | 0.139 | 74 |
| 200 | 0.302 | 0.563 | 0.257 | −17 |

TABLE 5

K-Values for COS Hydrolysis Reaction

| Reactor Isothermal Temp (° C.) | Inventive Catalyst (k-value) | Comparison Catalyst A (k-value) | Comparison Catalyst B (k-value) | RVA Improvement vs. Catalyst A (%) |
|---|---|---|---|---|
| 260 | 2.8 | 3.0 | 2.3 | −7 |
| 240 | 2.4 | 1.9 | 1.6 | 26 |
| 220 | 1.2 | 0 | 0.4 | ∞ |
| 200 | 0.4 | 0 | 0.4 | ∞ |

TABLE 6

K-Values for CO Water Gas Shift Reaction

| Reactor Isothermal Temp (° C.) | Inventive Catalyst (k-value) | Comparison Catalyst A (k-value) | Comparison Catalyst B (k-value) | RVA Improvement vs. Catalyst A (%) |
|---|---|---|---|---|
| 260 | 3.4 | 3.2 | | 28 |
| 240 | 2.7 | 2.4 | | 42 |
| 220 | 1.6 | 0.8 | | 188 |
| 200 | 1.1 | 0.5 | | 100 |

The data presented in the above Tables show that the inventive catalyst exhibits enhanced catalytic performance over the comparative low-metals, co-mulled catalyst composition and the comparative impregnated catalyst composition.

It is demonstrated that the reaction rate constant provided by the inventive catalyst for the carbonyl sulfide hydrolysis reaction at the lower temperatures in comparison to that of Catalyst A is significantly higher and that this rate constant at the higher reaction temperature is relatively unchanged. In a comparison to Catalyst B, the COS hydrolysis reaction rate constant provided by the inventive catalyst is significantly higher at all reaction temperatures with the exception of the very low temperature of 200° C., at which temperature, the rate constants provided by the two catalysts are substantially equivalent.

As a result of the higher COS hydrolysis reaction rate constant provided by the inventive catalyst, a much reduced concentration of unconverted carbonyl sulfide is yielded with the treated gas stream as compared to that which results with the comparison catalysts. This reduced concentration of unconverted carbonyl sulfide results with the use of the inventive catalyst even at the lower or reduced reaction temperatures.

FIG. 1 shows the data presented in Table 3 in the form of a bar chart, and it helps illustrate the enhanced performance characteristics of the inventive catalyst when compared to the low-metals, co-mulled catalyst composition (Catalyst A) and the impregnated catalyst (Catalyst B).

The inventive catalyst composition also exhibits improved reaction performance for the carbon monoxide water-gas shift equilibrium reaction when compared to the performance of the comparison catalysts. The reaction rate constant provided by the inventive catalyst is significantly improved for all temperatures when compared with that provided by Catalyst A. And, when the rate constant is compared against Catalyst B, the inventive catalyst provides for a greater reaction rate constant at all temperatures except the very lowest of the temperature at which the rate constants are closely equivalent.

The higher water-gas rate constant provides for a much reduced concentration of unconverted carbon monoxide that is yielded with the treated gas stream as compared to that which results with the comparison catalyst. The higher rate constant allows for the operation of the reactor at low reaction temperatures.

Figure 2:
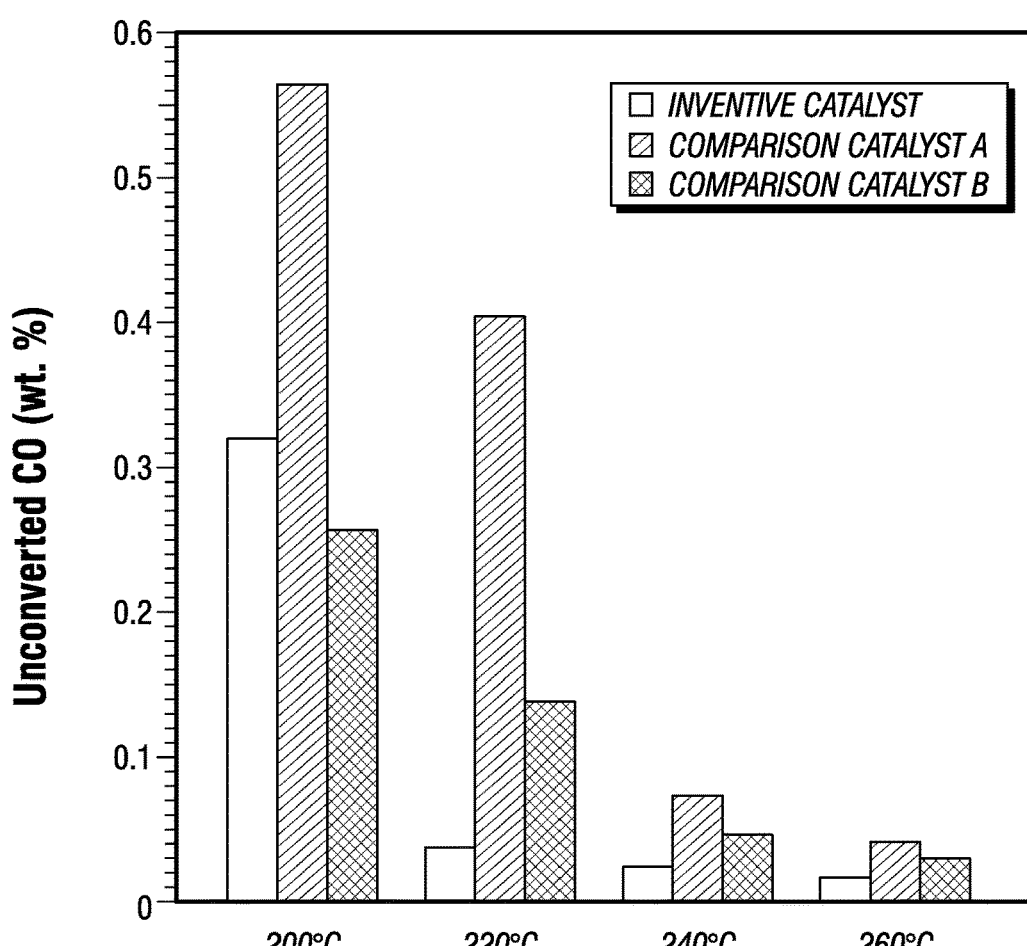
FIG. 2 is a bar chart comparing the performance of the inventive catalyst to that of comparison catalysts when used in the hydrolysis conversion of carbon monoxide (CO) contained in a synthetic tail gas feed by showing the unconverted CO of the effluent of the reactor operated at various reactor temperatures.

FIG. 2 shows the data presented in Table 4 in the form of a bar chart, and it helps illustrate the enhanced performance characteristics of the inventive catalyst when compared to the low-metals, co-mulled catalyst composition and the impregnated catalyst.

That which is claimed is:

1. A hydrolysis process, comprising: introducing a gas stream comprising a sulfur compound selected from the group of compounds consisting of carbonyl sulfide (COS), carbon disulfide ($CS_2$), sulfur dioxide ($SO_2$), and elemental sulfur ($S_x$), carbon monoxide, or a combination of the sulfur compound and carbon monoxide, into a reactor that defines a reaction zone containing a catalyst composition; and contacting the gas stream with the catalyst composition in the presence of water and hydrogen, wherein the catalyst composition comprises a formed agglomerate of a comulled mixture comprising pseudoboehmite, a cobalt compound and a molybdenum compound, wherein the comulled mixture has been calcined to provide the catalyst composition comprising gamma-alumina, at least 7.5 wt. % molybdenum, and at least 2.75 wt. % cobalt, and wherein each wt. % is based on the total weight of the catalyst composition and the metal as an oxide regardless of its actual form, wherein the catalyst composition has a bimodal pore structure such that less than 6 percent of the total pore volume of the catalyst composition is contained within pores having a pore diameter greater than 10,000 Å, wherein the bimodal pore structure of the catalyst composition is further characterized such that greater than 15% and less than 60% of the total pore volume of the catalyst composition is contained within pores having a pore diameter in the range of from 50 Å to 150 Å, wherein the bimodal pore structure of the catalyst composition is further characterized such that greater than 10% and less than 50% of the total pore volume of the catalyst composition is contained within pores having a pore diameter in the range of from 1000 Å to 10,000 Å, and wherein the reaction zone is operated at reaction conditions comprising a reactor inlet temperature of less than 250 C.

2. A process as recited in claim 1, wherein the sulfur compound is present in the gas stream at a sulfur compound concentration in the range of from 0.01 volume % to 2 volume %.

3. A process as recited in claim 2, comprising operating the reaction zone at reaction conditions comprising a reactor inlet temperature that is in the range of from 140° C. to 250° C.

4. A process as recited in claim 3, wherein the reduced concentration of sulfur compound in the treated gas is less than 75 ppm.

* * * * *